(12) United States Patent
Lee

(10) Patent No.: US 11,494,263 B2
(45) Date of Patent: Nov. 8, 2022

(54) CONTROLLER AND METHOD OF OPERATING THE SAME

(71) Applicant: SK hynix Inc., Icheon (KR)

(72) Inventor: Dong Sop Lee, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 17/333,913

(22) Filed: May 28, 2021

(65) Prior Publication Data

US 2022/0171675 A1 Jun. 2, 2022

(30) Foreign Application Priority Data

Nov. 30, 2020 (KR) .................. 10-2020-0164597

(51) Int. Cl.
*G11C 29/00* (2006.01)
*G06F 11/10* (2006.01)
*G06F 3/06* (2006.01)

(52) U.S. Cl.
CPC ........ *G06F 11/1068* (2013.01); *G06F 3/0608* (2013.01); *G06F 3/0619* (2013.01); *G06F 3/0653* (2013.01); *G06F 3/0679* (2013.01); *G06F 11/1004* (2013.01)

(58) Field of Classification Search
CPC ............ G06F 11/1068; G06F 11/1004; G06F 3/0679; G06F 3/0608; G06F 3/0653; G06F 3/0619
See application file for complete search history.

(56) References Cited

U.S. PATENT DOCUMENTS

| | | | |
|---|---|---|---|
| 2008/0201689 A1* | 8/2008 | Lin | .................. H03M 13/6569 717/106 |
| 2018/0081754 A1* | 3/2018 | Berman | .............. G06F 11/1012 |

FOREIGN PATENT DOCUMENTS

| | | |
|---|---|---|
| KR | 100801083 B1 | 2/2008 |
| KR | 20180063475 A | 6/2018 |

* cited by examiner

*Primary Examiner* — Samir W Rizk

(57) ABSTRACT

The present technology includes a controller and a method of operating the same. The controller includes a buffer in which N bits of data are stored, and a cyclic redundancy check controller configured to divide the N bits of data stored in the buffer into m data groups each including K bits of data, generate compressed data including K bits by processing data included in the m data groups, and generate a cyclic redundancy check code using the compressed data.

18 Claims, 16 Drawing Sheets

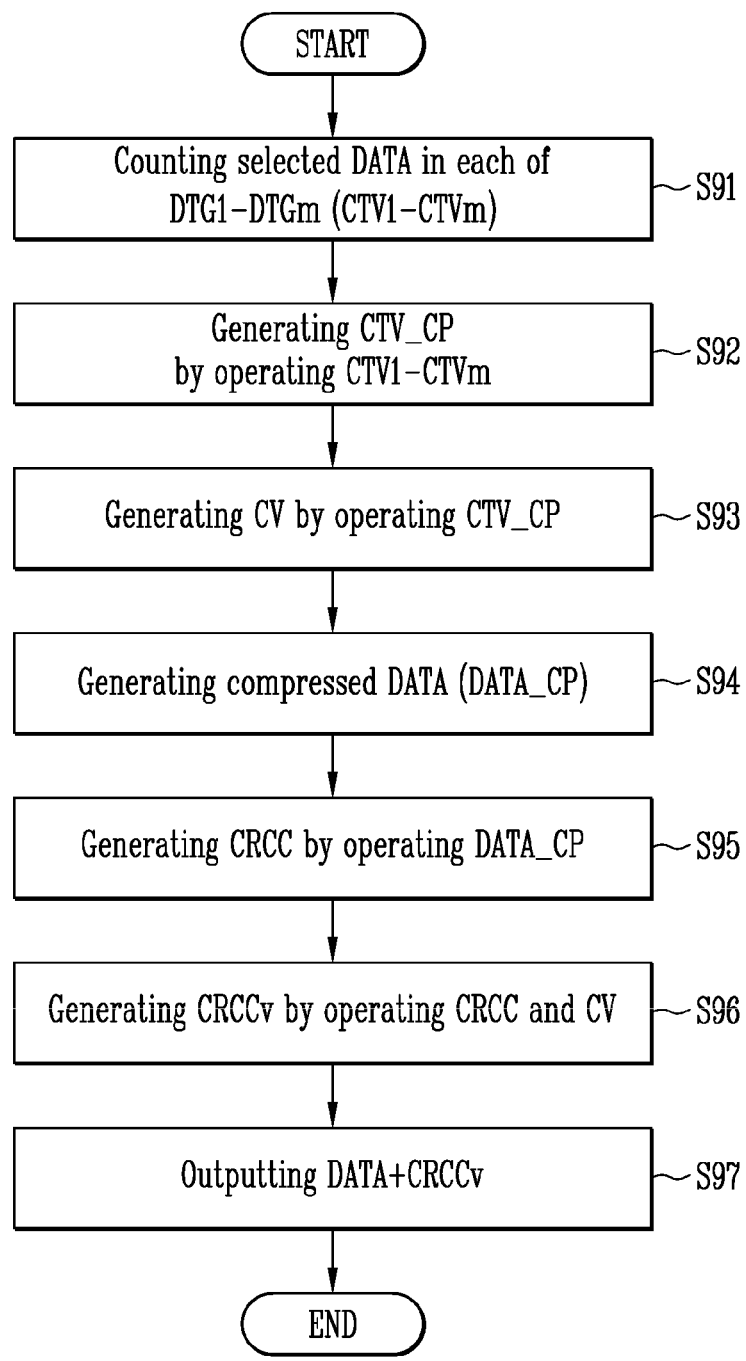

CONTROLLER AND METHOD OF OPERATING THE SAME

CROSS-REFERENCE TO RELATED APPLICATION

The present application claims priority under 35 U.S.C. § 119(a) to Korean patent application number 10-2020-0164597, filed on Nov. 30, 2020, in the Korean Intellectual Property Office, the entire disclosure of which is incorporated herein by reference.

BACKGROUND

1. Field of Invention

The present disclosure relates to a controller and a method of operating the same, and more particularly, to a controller capable of generating a cyclic redundancy check code and a method of operating the same.

2. Description of Related Art

A memory system may be configured to store data transmitted from a host or output the stored data to the host under the control of the host. The memory system may include a storage device capable of storing data and a controller capable of controlling the storage device. The storage device may include a plurality of memory devices. The memory devices may be classified into a volatile memory device and a nonvolatile memory device. The controller may be configured to communicate between the host and the storage device.

The controller may generate a cyclic redundancy check code for checking data received from the host before transmitting the data to the storage device. For example, the controller may generate the cyclic redundancy check code by processing original data, generate a data set by adding the cyclic redundancy check code to the original data, and transmit the data set to the storage device.

Recently, as an amount of data transmitted between the host and the controller increases, complexity of the operation for generating the cyclic redundancy check code is increasing.

SUMMARY

An embodiment of the present disclosure provides a controller capable of reducing complexity of an operation for generating a cyclic redundancy check code and a method of operating the same.

According to an embodiment of the present disclosure, a controller includes a buffer in which N bits of data are stored, and a cyclic redundancy check controller configured to divide the N bits of data stored in the buffer into m data groups each including K bits of data, generate compressed data including K bits by processing data included in the m data groups, and generate a cyclic redundancy check code using the compressed data.

According to an embodiment of the present disclosure, a method of operating a controller includes dividing input data into a plurality of data groups, generating compressed data by logically combining data included in the plurality of data groups in a bit unit, and generating a cyclic redundancy check code by performing a cyclic redundancy check operation on the compressed data.

The present technology may reduce complexity of an operation for generating a cyclic redundancy check code even though a size of data increases.

BRIEF DESCRIPTION OF THE DRAWINGS

FIG. 9 is a flowchart illustrating a method of operating a controller according to a third embodiment of the present disclosure.

DETAILED DESCRIPTION

Figure 1:
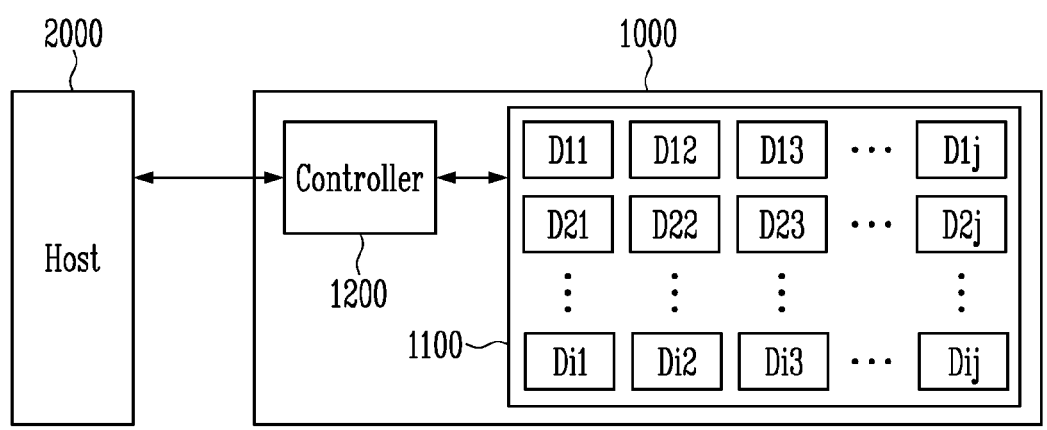
FIG. 1 illustrates a memory system according to an embodiment of the present disclosure.

FIG. 1 illustrates a memory system 1000 according to an embodiment of the present disclosure.

Referring to FIG. 1, the memory system 1000 may include a storage device 1100 capable of storing data and a controller 1200 capable of controlling the storage device 1100.

The storage device 1100 may include a plurality of dies D11 to Dij, i and j being positive integers. The dies D11 to Dij may be memory devices configured identically to each other. The dies D11 to Dij may perform a program, read, or erase operation in response to a command provided by the controller 1200. The dies D11 to Dij may be configured as a nonvolatile memory device. For example, the nonvolatile memory device may include an electrically erasable and programmable ROM (EEPROM), a NAND flash memory, a NOR flash memory, a phase-change RAM (PRAM), a resistive RAM (ReRAM), a ferroelectric RAM (FRAM), a spin transfer torque-magnetic RAM (STT-MRAM), or the like.

The controller 1200 may communicate between a host 2000 and the storage device 1100. For example, the controller 1200 may generate a program, read, or erase command according to a request provided by the host 2000 and transmit the generated command to a selected die of the storage device 1100.

The controller 1200 may generate a cyclic redundancy check (CRC) code for checking data when the data is transmitted between the host 2000 and the storage device 1100. For example, the controller 1200 may divide input data into a plurality of groups, and generate the cyclic redundancy check code by processing the data for each group.

Figure 2:
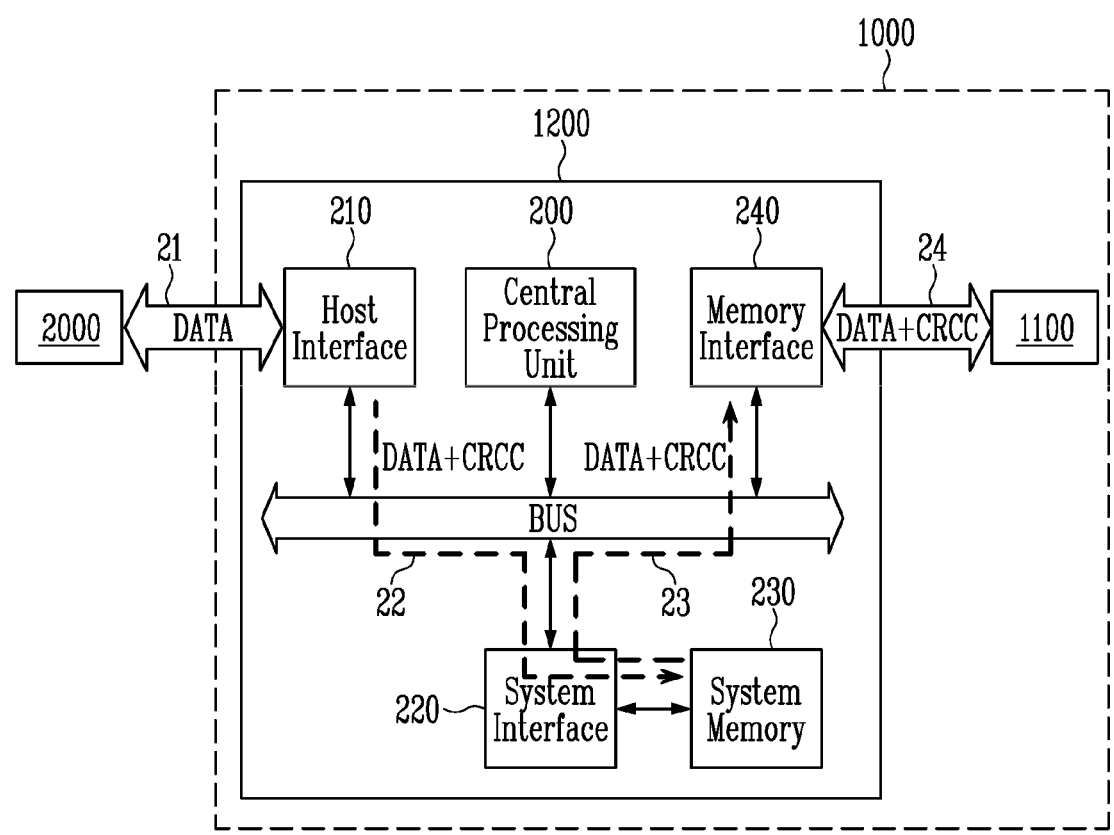
FIG. 2 illustrates a controller of FIG. 1 according to an embodiment of the present disclosure.

FIG. 2 specifically illustrates the controller 1200 of FIG. 1 according to an embodiment of the present disclosure.

Referring to FIG. 2, when transmitting the data between the host 2000 and the storage device 1100, the controller 1200 may generate a CRC code based on the data and transmit a data set in which the CRC code is added to the data. For example, the controller 1200 may include a central processing unit 200, a host interface 210, a system interface 220, a system memory 230, and a memory interface 240. The central processing unit 200, the host interface 210, the system interface 220, and the memory interface 240 may communicate with each other through a bus BUS.

The central processing unit 200 may include software and hardware capable of controlling an overall operation of the controller 1200. For example, the central processing unit 200 may control the host interface 210, the system interface 220, and the memory interface 240 according to a request of the host 2000 received through the host interface 210. In addition, the central processing unit 200 may perform a background operation for improving or managing performance of the memory system 1000 even though the request is not provided by the host 2000.

The host interface 210 may transmit the received request to the central processing unit 200 and transmit data DATA between the host 2000 and the controller 1200 when the request is received from the host 2000. For example, in the program operation, when the host interface 210 receives the data DATA from the host 2000, the host interface 210 may perform a cyclic redundancy check operation for checking the received data DATA and generate a cyclic redundancy check code CRCC. The cyclic redundancy check operation may be one of various operations for checking the data DATA. Since the cyclic redundancy check operation generates the cyclic redundancy check code CRCC by processing the data DATA, as a size of the data DATA received from the host 2000 increases, complexity of the cyclic redundancy check operation may increase and a time required for performing the cyclic redundancy check operation may increase. For example, as a size of a channel 21 between the host 2000 and the controller 1200 increases, the complexity of the cyclic redundancy check operation performed in the host interface 210 increases.

Accordingly, in the present embodiment, a technique for simplifying the cyclic redundancy check operation is provided.

When the cyclic redundancy check code CRCC is generated, the host interface 210 may output a data set DATA+CRCC obtained by adding the cyclic redundancy check code CRCC to the data DATA.

The data set DATA+CRCC output from the host interface 210 may be transmitted to the system memory 230 through the bus BUS and the system interface 220 (22). The system interface 220 may transmit the data set DATA+CRCC loaded on the bus BUS to the system memory 230 under the control of the central processing unit 200 (22).

The system memory 230 may temporarily store various pieces of information used and to be used by the controller 1200. For example, the system memory 230 may be configured of a volatile memory such as a DRAM, an SRAM, or the like. Therefore, the information stored in the system memory 230 may be lost when power of the memory system 1000 is cut off. During the program operation, the data set DATA+CRCC temporarily stored in the system memory 230 may be maintained until the program operation of the data set DATA+CRCC is completed in the storage device 1100.

Under the control of the system interface 220, the data set DATA+CRCC stored in the system memory 230 may be transmitted to the memory interface 240 through the bus BUS (23).

The memory interface 240 may transmit the data set DATA+CRCC between the controller 1200 and the storage device 1100. For example, in the program operation, the memory interface 240 may receive the data set DATA+CRCC from the system interface 220 (23), and check the data DATA using the cyclic redundancy check code CRCC included in the received data set DATA+CRCC. As a result of the checking, when an error does not exist in the data DATA, the memory interface 240 may transmit the data set DATA+CRCC to the storage device 1100 through a channel 24. The memory interface 240 may transmit a command and an address in addition to the data set DATA+CRCC.

The host interface 210 and the memory interface 240 may perform the cyclic redundancy check operation. In an embodiment described below, the host interface 210 performing the cyclic redundancy check operation is described, but the present embodiment may also be applied to the memory interface 240.

Figure 3:
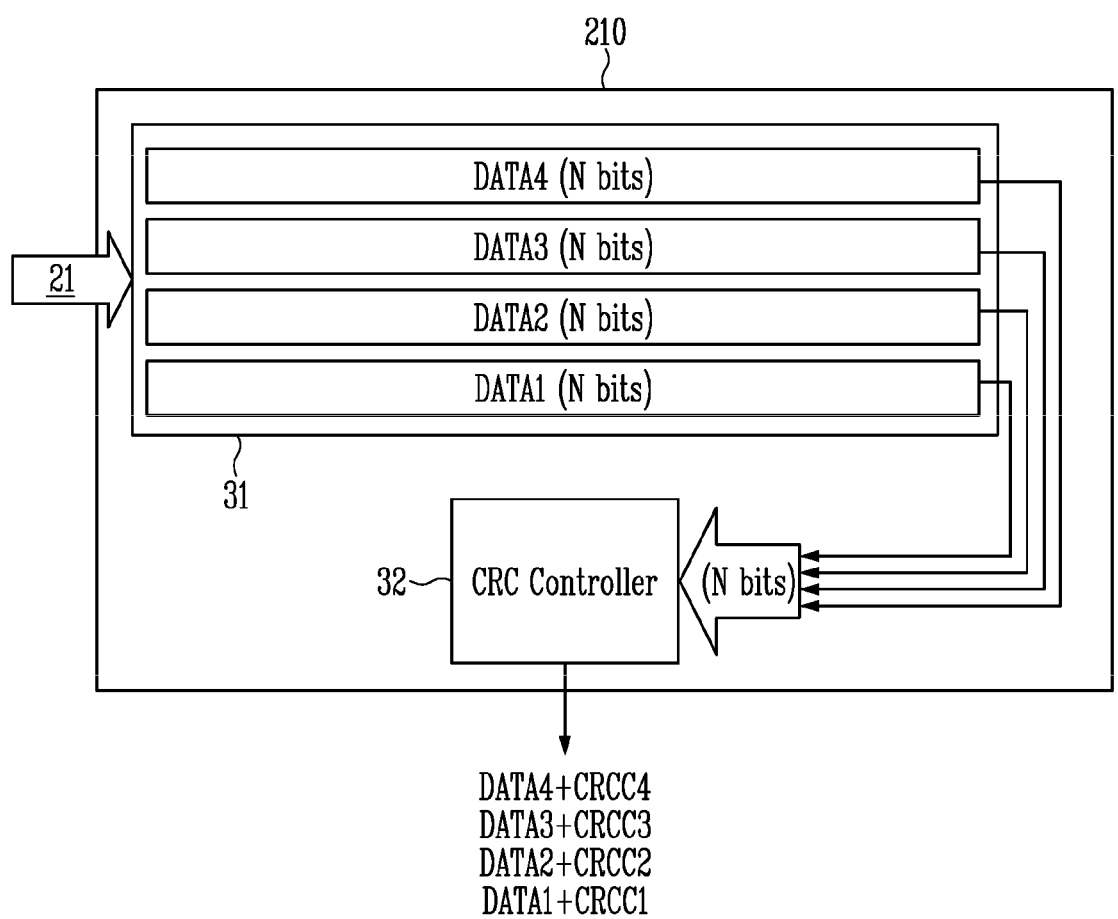
FIG. 3 illustrates a host interface of FIG. 2 according to an embodiment of the present disclosure.

FIG. 3 illustrates the host interface 210 of FIG. 2 according to an embodiment of the present disclosure.

Referring to FIG. 3, the host interface 210 may include a buffer 31 and a cyclic redundancy check (CRC) controller 32.

The buffer 31 may temporarily store the data DATA received from the host 2000. Therefore, as the size of the channel 21 connected to the host 2000 increases, a size of the data DATA stored in the buffer 31 may increase. For example, assuming that N bits of data (N is a positive integer) are input through the channel 21 during one cycle, N bits of first data DATA1 may be input to the buffer 31 during a first cycle, N bits of second data DATA2 may be input to the buffer 31 during a second cycle, N bits of third data DATA3 may be input to the buffer 31 during a third cycle, and N bits of fourth data DATA4 may be input to the buffer 31 during a fourth cycle The CRC controller 32 may generate a first cyclic redundancy check code CRCC1 by performing the cyclic redundancy check operation on the first data DATA1, and output a first data set DATA1+CRCC1 including the first data DATA1 and the first cyclic redundancy check code CRCC1. In such a method, the CRC controller 32 may sequentially output second to fourth data sets DATA2+CRCC2, DATA3+CRCC3, and DATA4+CRCC4 by performing the cyclic redundancy check operation on each of the remaining second to fourth data DATA2 to DATA4.

However, as a size of data processed by the memory system 1000 increases, N may increase, and as N increases, complexity of the cyclic redundancy check operation increases. Therefore, a time taken in the CRC controller 32 to output the first to fourth data sets DATA1+CRCC1, DATA2+CRCC2, DATA3+CRCC3, and DATA4+CRCC4 may increase.

Accordingly, in the present embodiment, the data DATA stored in the buffer 31 may be divided into a plurality of data groups each of which includes a plurality of bits whose number is less than N, and the cyclic redundancy check operation may be performed in a data group unit, i.e., the cyclic redundancy check operation may be performed for each data group.

Figure 4:
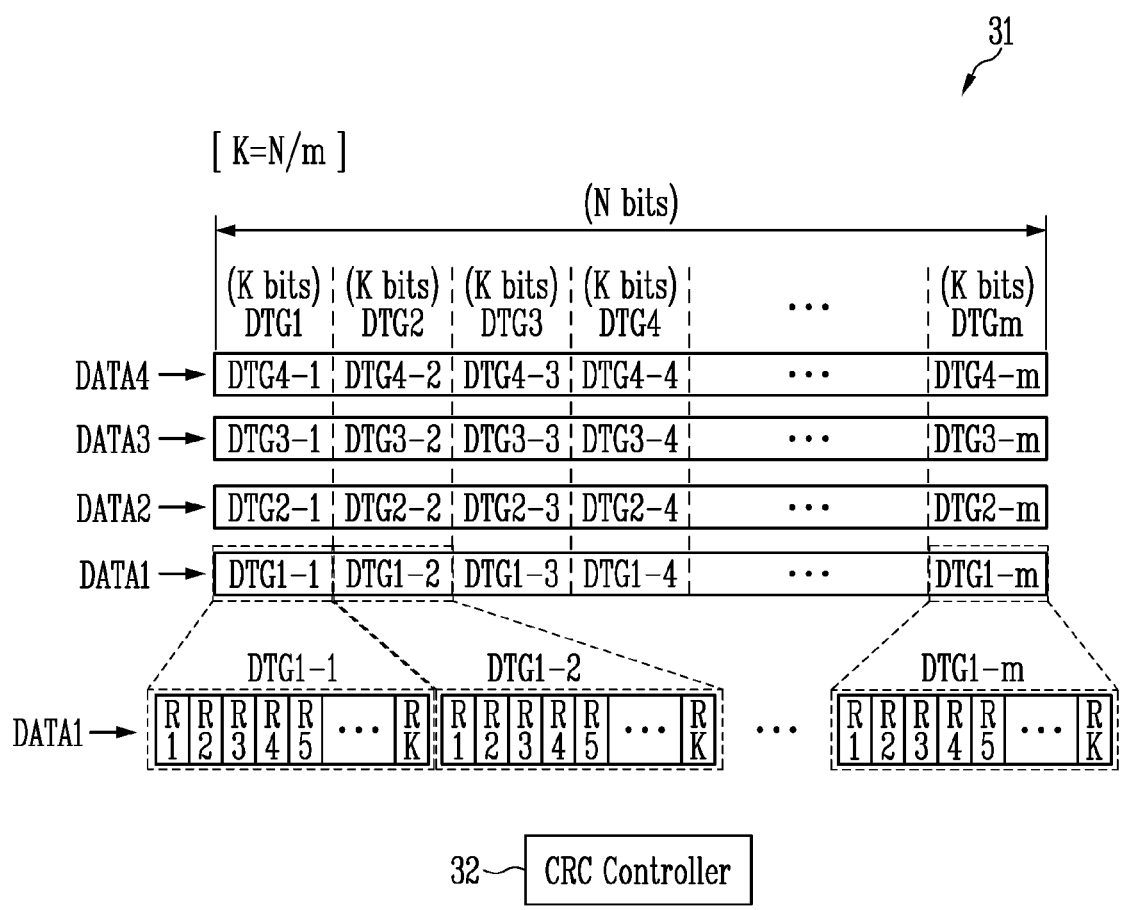
FIG. 4 illustrates a method of dividing data according to an embodiment of the present disclosure.

FIG. 4 illustrates a method of dividing data according to an embodiment. The method illustrated in FIG. 4 will described with reference to FIGS. 2 and 3.

Referring to FIG. 4, it is assumed that a size of data DATA received through the channel 21 per cycle is N bits. The CRC controller 32 may divide the N bits of data DATA stored in the buffer 31 into m data groups DTG1 to DTGm. Each of the data groups DTG1 to DTGm may be configured of K bits of data. That is, since the N bits of data DATA are divided into the m data groups each of which is configured of K bits, K becomes N/m.

For example, when N bits of first data DATA1 are input to the buffer 31, the first data DATA1 may be divided into (1-1)-th to (1-m)-th data groups DTG1-1 to DTG1-m, and K bits of data may be included in each of the (1-1)-th to (1-m)-th data groups DTG1-1 to DTG1-m. The second data DATA2 input in a next cycle of the first data DATA1 may also be divided into (2-1)-th to (2-m)-th data groups DTG2-1 to DTG2-m. The third and fourth data DATA3 and DAT4 may also be respectively divided into (3-1)-th to (3-m)-th data groups DTG3-1 to DTG3-m and (4-1)-th to (4-m)-th data groups DTG4-1 to DTG4-$m$.

Alternatively, the data DATA may be divided into a plurality of data groups corresponding to the number of lanes through which the data DATA is transmitted between the host 2000 and the controller 1200. For example, when the channel 21 includes two lanes, the data DATA may be divided into first and second data groups DTGi-1 and DTGi-2, and when the channel 21 includes four lanes, the data DATA may be divided into first to fourth data groups DTGi-1 to DTGi-4.

The buffer 31 may include a plurality of cells capable of storing data, and each cell may store 1 bit of data. For example, since the (1-1)-th data group DTG1-1 includes the K bits of data, the K bits of data of the (1-1)-th data group DTG1-1 may be stored in first to K-th cells R1 to RK, respectively. The first to K-th cells R1 to RK may also be allocated to each of the remaining data groups, and 1 bit of data may be stored in each cell. For another example, the buffer 31 may include a plurality of cell groups respectively corresponding to the (1-1)-th to (1-m)-th data groups DTG1-1 to DTG1-m, each cell group including K cells, and the K cells may respectively store the K bits of data included in a corresponding one of the (1-1)-th to (1-m)-th data groups DTG1-1 to DTG1-m.

In the present embodiment, the cyclic redundancy check code CRCC may be determined for each data group, and specific embodiments thereof are described as follows.

Figure 5:
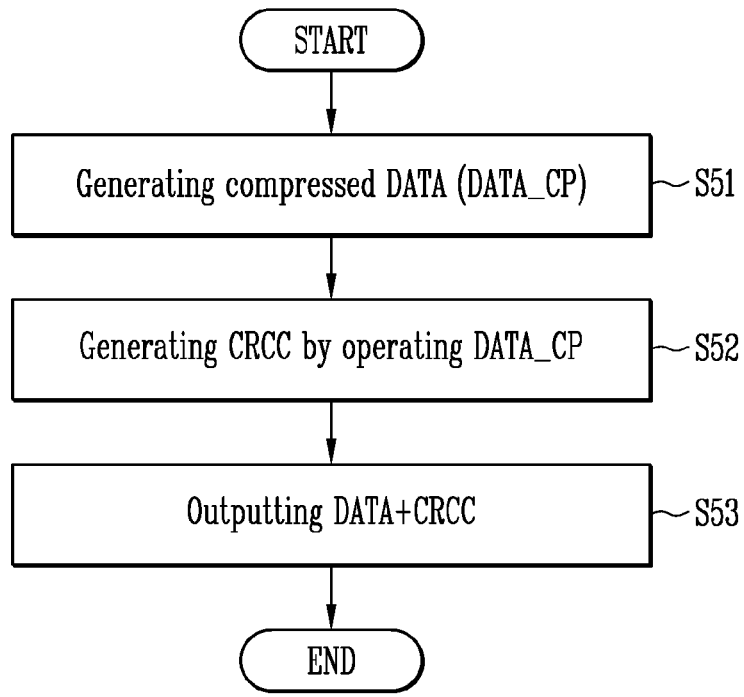
FIG. 5 is a flowchart illustrating a method of operating a controller according to a first embodiment of the present disclosure.

FIG. 5 is a flowchart illustrating a method of operating a controller according to a first embodiment of the present disclosure. The method illustrated in FIG. 5 will be described with reference to FIG. 4.

Referring to FIG. 5, when data DATA including N bits is input to the buffer 31, the CRC controller 32 may divide the N bits of data DATA to the first to m-th data groups DTG1 to DTGm.

Subsequently, the CRC controller 32 may generate compressed data DATA_CP by compressing the data DATA of the first to m-th data groups DTG1 to DTGm at S51. For example, the CRC controller 32 may generate the compressed data DATA_CP having K bits by logically combining data stored in corresponding cells selected from the first to m-th data groups DTG1 to DTGm.

The CRC controller 32 may generate the cyclic redundancy check code CRCC by performing the cyclic redundancy check operation on the compressed data DATA_CP having K bits at S52. Since the compressed data DATA_CP includes the K bits of data less than the N bits of data DATA, complexity of the cyclic redundancy check operation performed by the CRC controller 32 may be reduced, and thus, a time required for performing the cyclic redundancy check operation may be reduced.

When the cyclic redundancy check code CRCC is generated, the CRC controller 32 may output a data set DATA+CRCC, in which the cyclic redundancy check code CRCC is added to the data DATA, at S53.

The method according to the first embodiment described with reference to FIG. 5 is more specifically described as follows.

Figure 6A:
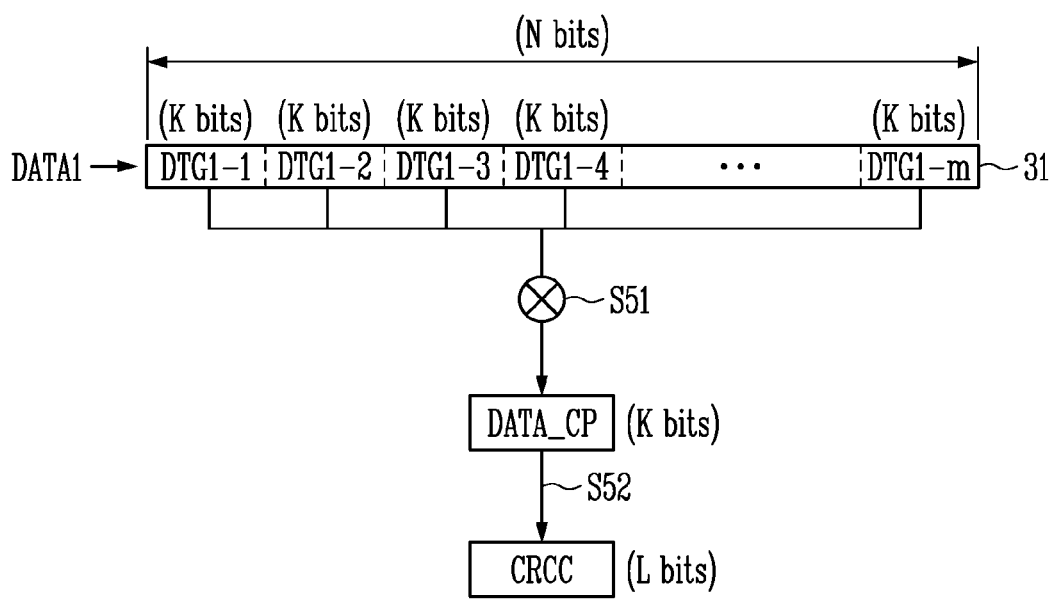
FIGS. 6A and 6B specifically illustrate the method of operating the controller according to the first embodiment of the present disclosure.
Figure 6B:
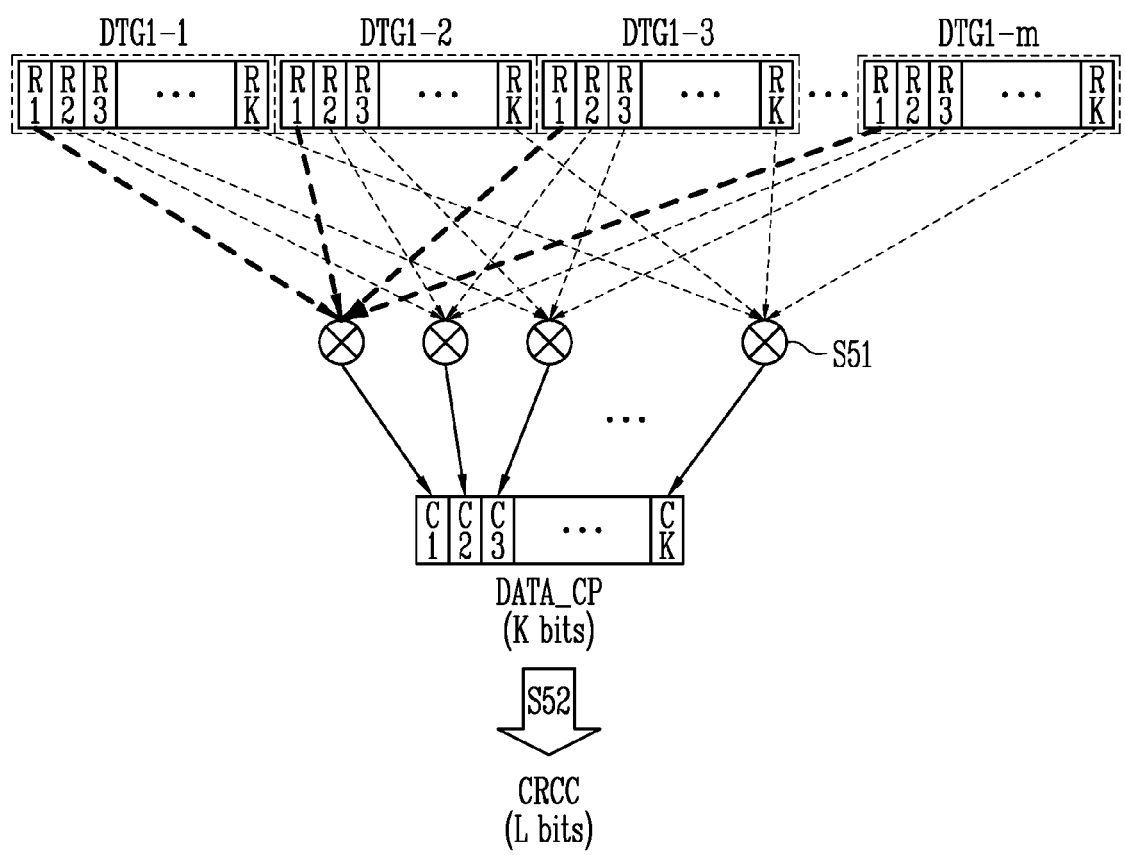

FIGS. 6A and 6B specifically illustrate the method of operating the controller according to the first embodiment of the present disclosure.

FIG. 6A shows a method of generating the cyclic redundancy check code CRCC of the first data DATA1. When the N bits of first data DATA1 are input to the buffer 31, the first data DATA1 may be divided into the (1-1)-th to (1-m)-th data groups DTG1-1 to DTG1-m. Each of the (1-1)-th to (1-m)-th data groups DTG1-1 to DTG1-m may include K bits of data that are less than the N bits of data.

The compressed data DATA_CP may be generated by performing an XOR operation on the (1-1)-th to (1-m)-th data groups DTG1-1 to DTG1-m at S51. For example, the CRC controller 32 may generate the compressed data DATA_CP by performing an XOR operation on 1 bit of data at the same position in each of the (1-1)-th to (1-m)-th data groups DTG1-1 to DTG1-m. In other words, a value obtained by performing an XOR operation on m data each of which is selected from each of the (1-1)-th to (1-m)-th data groups DTG1-1 to DTG1-m may become 1 bit of data of the compressed data DATA_CP. In such a method, the CRC controller 32 may generate the compressed data DATA_CP including K bits each of which is obtained by performing an XOR operation on m data at the same position in the (1-1)-th to (1-m)-th data groups DTG1-1 to DTG1-m. For example, the XOR operation is performed on first bits among the K bits of each of the (1-1)-th to (1-m)-th data groups DTG1-1 to DTG1-m to generate a first bit of the compressed data DATA_CP.

When the compressed data DATA_CP is generated, the CRC controller 32 may generate the cyclic redundancy check code CRCC by performing the cyclic redundancy check operation on the compressed data DATA_CP at S52. The cyclic redundancy check code CRCC may be generated to include L bits. L may be a positive integer and may vary according to the cyclic redundancy check operation.

Since the CRC controller 32 generates the cyclic redundancy check code CRCC using the K bits of compressed data DATA_CP instead of the N bits of first data DATA1 stored in the buffer 31, the cyclic redundancy check code CRCC may be generated faster than performing the operation using the N bits of first data DATA1. The processes S51 and S52 described with reference to FIGS. 5 and 6A are more specifically described as follows.

Referring to FIG. 6B, at S51, the compressed data DATA_CP may be generated by performing an XOR operation on 1 bit of data included in each of the (1-1)-th to (1-m)-th data groups DTG1-1 to DTG1-m. For example, when each of the (1-1)-th to (1-m)-th data groups DTG1-1 to DTG1-m, which includes K bits, is stored in first to K-th cells R1 to RK, a value obtained by performing an XOR operation on the m data stored in the first cells R1 of the (1-1)-th to (1-m)-th data groups DTG1-1 to DTG1-m may be first compressed data C1 of the compressed data DATA_CP, a value obtained by performing an XOR operation on the m data stored in the second cells R2 of the (1-1)-th to (1-m)-th data groups DTG1-1 to DTG1-m may be second compressed data C2 of the compressed data DATA_CP, a value obtained by performing an XOR operation on the m data stored in the third cells R3 of the (1-1)-th to (1-m)-th data groups DTG1-1 to DTG1-m may be third compressed data C3 of the compressed data DATA_CP, and a value obtained by performing an XOR operation on the m data stored in the K-th cells RK of the (1-1)-th to (1-m)-th data groups DTG1-1 to DTG1-m may be K-th compressed data CK of the compressed data DATA_CP. Therefore, the number of bits included in the compressed data DATA_CP is the same as the number of bits included in each of the (1-1)-th to (1-m)-th data groups DTG1-1 to DTG1-m. For example, assuming that each of the (1-1)-th to (1-m)-th data groups DTG1-1 to DTG1-m includes the K bits of data as shown above, the compressed data DATA_CP may also include K bits of data.

At S52, the CRC controller 32 may generate the L bits of cyclic redundancy check code CRCC by performing the cyclic redundancy check operation on the K bits of compressed data DATA_CP. That is, in the prior art, the cyclic redundancy check operation is performed using the N bits of data, but in the present embodiment, the cyclic redundancy check operation is performed using the K bits of compressed data DATA_CP that is less than the N bits of data. Therefore, the cyclic redundancy check operation may be simplified and its operation time may also be shortened.

Figure 7:
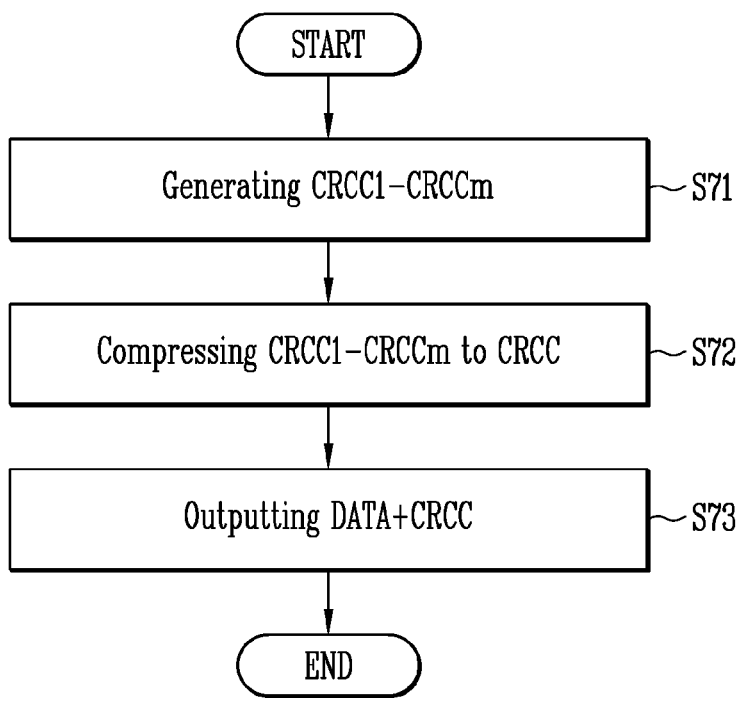
FIG. 7 is a flowchart illustrating a method of operating a controller according to a second embodiment of the present disclosure.

FIG. 7 is a flowchart illustrating a method of operating a controller according to a second embodiment of the present disclosure. The method illustrated in FIG. 7 will be described with reference to FIG. 4.

Referring to FIG. 7, when the data DATA including N bits is input to the buffer 31, the CRC controller 32 may divide the N bits of data DATA into the first to m-th data groups DTG1 to DTGm.

The CRC controller 32 may generate first to m-th cyclic redundancy check codes CRCC1 to CRCCm corresponding to the respective first to m-th data groups DTG1 to DTGm at S71. For example, the CRC controller 32 may generate the first cyclic redundancy check code CRCC1 by processing the data included in the first data group DTG1, and generate the m-th cyclic redundancy check code CRCCm by processing the data included in the m-th data group DTGm. When each of the first to m-th data groups DTG1 to DTGm includes the K bits of data, since the first to m-th cyclic redundancy check codes CRCC1 to CRCCm are generated using the K bits that is less than N bits, the time required for performing the cyclic redundancy check operation may be reduced compared to a case where the N bits of data are used.

Subsequently, the CRC controller 32 may generate the cyclic redundancy check code CRCC by compressing the first to m-th cyclic redundancy check codes CRCC1 to CRCCm at S72.

When the cyclic redundancy check code CRCC is generated, the CRC controller 32 may output the data set DATA+CRCC, in which the cyclic redundancy check code CRCC is added to the data DATA, at S73.

The method according to the second embodiment described with reference to FIG. 7 is more specifically described as follows.

Figure 8:
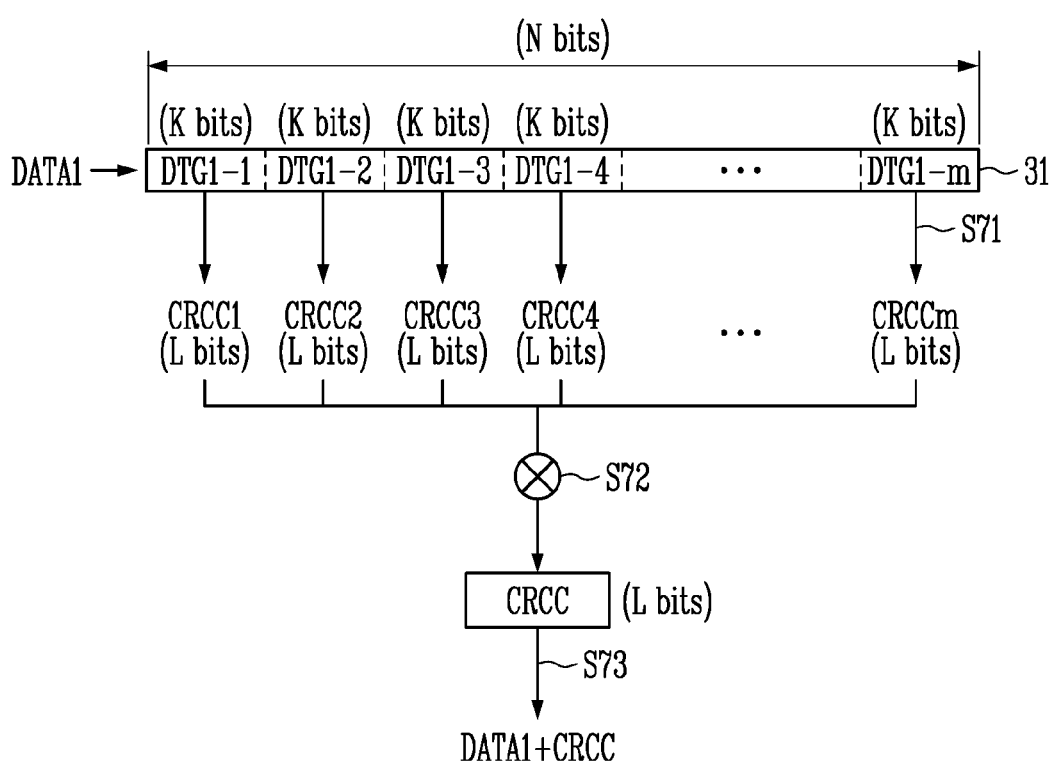
FIG. 8 specifically illustrates the method of operating the controller according to the second embodiment of the present disclosure.

FIG. 8 specifically illustrates the method of operating the controller according to the second embodiment of the present disclosure.

Referring to FIG. 8, when the N bits of first data DATA1 are input to the buffer 31, the CRC controller 32 may divide the first data DATA1 into the (1-1)-th to (1-m)-th data groups DTG1-1 to DTG1-m.

Assuming that each of the (1-1)-th to (1-m)-th data groups DTG1-1 to DTG1-m includes the K bits of data, at S71, the first to m-th cyclic redundancy check codes CRCC1 to CRCCm respectively corresponding to the (1-1)-th to (1-m)-th data groups DTG1-1 to DTG1-m may be generated as a code of L bits less than K bits. For example, the CRC controller 32 may generate the first cyclic redundancy check code CRCC1 for the data included in the (1-1)-th data group DTG1-1, and generate the second cyclic redundancy check code CRCC2 for the data included in the (1-2)-th data group DTG1-2. In such a method, the CRC controller 32 may generate the first to m-th cyclic redundancy check codes CRCC1 to CRCCm respectively corresponding to the (1-1)-th to (1-m)-th data groups DTG1-1 to DTG1-$m$.

At S72, the cyclic redundancy check code CRCC may be generated by performing an XOR operation on data at the same position in the first to m-th cyclic redundancy check codes CRCC1 to CRCCm. For example, S72 may be performed in a method similar to that of S51 described with reference to FIG. 6B. That is, assuming that each of the first to m-th cyclic redundancy check codes CRCC1 to CRCCm is stored in first to L-th cells, a value obtained by performing an XOR operation on m data stored in the first cells of the first to m-th cyclic redundancy check codes CRCC1 to CRCCm may become a first bit of the cyclic redundancy check code CRCC, and a value obtained by performing an XOR operation on m data stored in the second cells of the first to m-th cyclic redundancy check codes CRCC1 to CRCCm may become a second bit of the cyclic redundancy check code CRCC. In such a method, when an XOR operation is performed on m data stored in the L-th cells of the first to m-th cyclic redundancy check codes CRCC1 to CRCCm, the L bits of cyclic redundancy check code CRCC may be finally generated.

At S73, the first data set DATA1+CRCC in which the cyclic redundancy check code CRCC is added to the first data DATA1 may be output.

FIG. 9 is a flowchart illustrating a method of operating a controller according to a third embodiment of the present disclosure. The method illustrated in FIG. 9 will be described with reference to FIG. 4.

Referring to FIG. 9, when the N bits of data DATA are input to the buffer 31, the CRC controller 32 may divide the data DATA into the first to m-th data groups DTG1 to DTGm, each of which includes K bits.

The CRC controller 32 may calculate first to m-th count values CTV1 to CTVm by counting the number of selected data included in each of the first to m-th data groups DTG1 to DTGm at S91. For example, when the selected data is 1, the number of 1 data included in the first data group DTG1 may be counted and determined as the first count value CTV1. Each of the first to m-th count values CTV1 to CTVm may be generated as a binary notation code. The number of bits included in each of the first to m-th count values CTV1 to CTVm may be the same. For example, when the first count value CTV1 includes J bits of data (J is a positive integer), each of the remaining second to m-th count values CTV2 to CTVm may also include J bits of data.

After that, the CRC controller 32 may generate a compression count value CTV_CP of the first to m-th count values CTV1 to CTVm at S92. For example, a value obtained by performing an XOR operation on all bits included in the first count value CTV1 may become first compressed data of the compression count value CTV_CP, and a value obtained by performing an XOR operation on all bits included in the second count value CTV2 may become second compressed data of the compression count value CTV_CP. In such a method, values obtained by performing an XOR operation on each of the remaining third to m-th count values CTV3 to CTVm may become third to m-th compressed data of the compression count value CTV_CP. Therefore, the number of bits of the compression count value CTV_CP is the same as the number of data groups DTG1 to DTGm.

The CRC controller 32 may generate a total count value CV by processing the compression count value CTV_CP at S93. For example, the total count value CV may be a value obtained by performing an XOR operation on all bits of the compression count value CTV_CP.

The CRC controller 32 may generate compressed data DATA_CP by compressing the data DATA of the first to m-th data groups DTG1 to DTGm at S94. For example, the CRC controller 32 may generate the compressed data DATA_CP having K bits by logically combining data stored in the cells at the same position, which are selected from the first to m-th data groups DTG1 to DTGm.

The CRC controller 32 may generate the cyclic redundancy check code CRCC by performing the cyclic redundancy check operation on the compressed data DATA_CP having K bits at S95. Since the compressed data DATA_CP includes the K bits less than N bits, the cyclic redundancy check operation performed by the CRC controller 32 may be simplified, and thus a time required for the cyclic redundancy check operation may be shortened.

Among the above-described S91 to S95, an order of S91 to S93 for generating the total count value CV and S94 to S95 for generating the cyclic redundancy check code CRCC may be changed.

The CRC controller 32 may generate a cyclic redundancy check count code CRCCv by logically combining the cyclic redundancy check code CRCC and the total count value CV at S96. For example, the cyclic redundancy check count code CRCCv may be calculated by performing an XOR operation on the cyclic redundancy check code CRCC and the total count value CV.

When the cyclic redundancy check count code CRCCv is generated, the CRC controller 32 may output a data set DATA+CRCCv in which the cyclic redundancy check count code CRCCv is added to the data DATA at S97.

The operation method according to the third embodiment described with reference to FIG. 9 is more specifically described as follows.

Figure 10A:
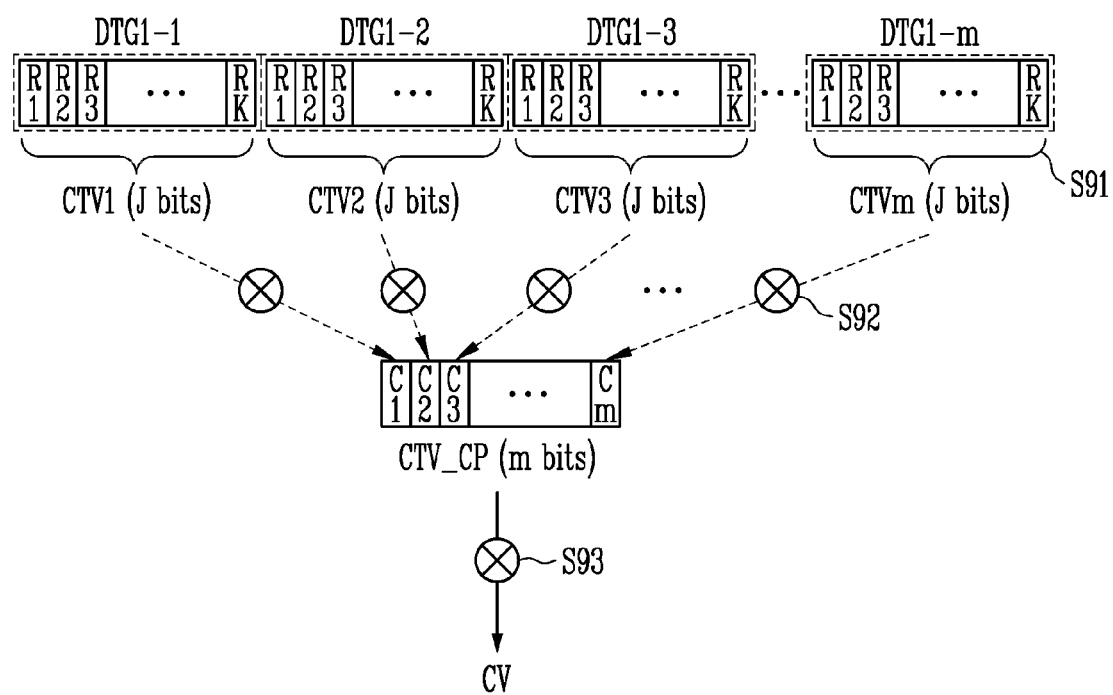
FIGS. 10A and 10B specifically illustrate the method of operating the controller according to the third embodiment of the present disclosure.
Figure 10B:
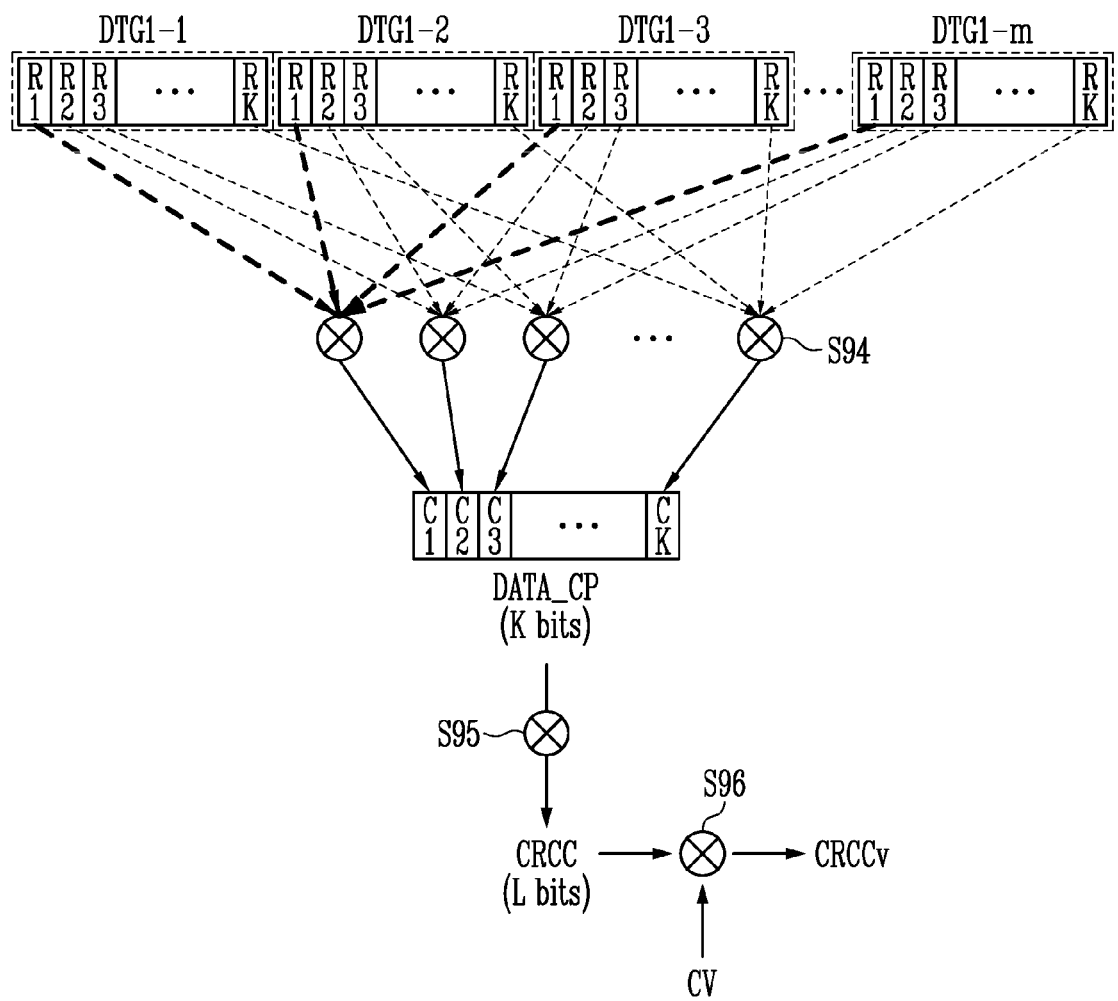

FIGS. 10A and 10B specifically illustrate the method of operating the controller according to the third embodiment of the present disclosure.

Referring to FIG. 10A, S91 to S93 described with reference to FIG. 9 are specifically shown.

At S91, the number of selected data included in each of the (1-1)-th to (1-m)-th data groups DTG1-1 to DTG1-m of the first data DATA1 may be calculated as the first to m-th count values CTV1 to CTVm. For example, it is assumed that the selected data is 1 and each of the (1-1)-th to (1-m)-th data groups DTG1-1 to DTG1-m includes the K bits of data. In this case, each of the (1-1)-th to (1-m)-th data groups DTG1-1 to DTG1-m may include the K bits of data respectively stored in the first to K-th cells R1 to RK. When the (1-1)-th data group DTG1-1 is described as an example, the data included in the (1-1)-th data group DTG1-1 may be stored in the first to K-th cells R1 to RK, each cell including 1 bit of data. The data stored in each cell includes 0 or 1, and 1 is the selected data in the present embodiment. Therefore, the CRC controller 32 may calculate the first count value CTV1 by counting the number of 1 data included in the (1-1)-th data group DTG1-1. Each of the first to m-th count values CTV1 to CTVm may be generated as a binary notation code. The number of bits of each of the first to m-th count values CTV1 to CTVm may be the same. For example, when the first count value CTV1 includes a J-bit code (J is a positive integer), each of the remaining second to m-th count values CTV2 to CTVm may also include a J-bit code.

For example, assuming that K is 32, since the data of the (1-1)-th data group DTG1-1 includes 32 bits, the maximum number of 1 data included in each data group is 32. When the decimal number 32 is converted into a binary number, 32 becomes 100000, and thus J may be set to an integer of at least 6 or more. That is, the first count value CTV1 may include at least 6 bits of data. In an embodiment, assuming that the data of the (1-1)-th data group DTG1-1 includes 32-bit data of 01000111010101110010101010000101, the number of 1 data included in the (1-1)-th data group DTG1-1 becomes 15. The CRC controller 32 may convert the counted value, 15, into 001111, which is a binary number, and the converted value, 001111, may become the first count value CTV1. In such a method, the remaining second to m-th count values CTV2 to CTVm may be calculated.

At S92, the CRC controller 32 may generate an m-bit compression count value CTV_CP by performing an XOR operation on each of the first to m-th count values CTV1 to CTVm.

For example, a value obtained by performing an XOR operation on all bits included in the first count value CTV1 may become the first compressed data C1 of the compression count value CTV_CP, and a value obtained by performing an XOR operation on all bits included in the second count value CTV2 may become the second compressed data C2 of the compression count value CTV_CP. In such a method, values obtained by performing an XOR operation on each of the remaining third to m-th count values CTV3 to CTVm may become third to m-th compressed data of the compression count value CTV_CP. Therefore, the number of bits of the compression count value CTV_CP becomes m that is identical to the number of data groups DTG1-1 to DTG1-m.

At S93, the CRC controller 32 may generate a total count value CV by processing the compression count value CTV_CP. For example, the total count value CV may be obtained by performing an XOR operation on all bits, i.e., the m bits, of the compression count value CTV_CP.

Referring to FIG. 10B, S94 to S96 described with reference to FIG. 9 are specifically shown.

At S94, the compressed data DATA_CP may be generated by performing an XOR operation on data stored in the cells at the same position of the (1-1)-th to (1-m)-th data groups DTG1-1 to DTG1-m. For example, a value obtained by performing an XOR operation on the m data stored in the first cells R1 of the (1-1)-th to (1-m)-th data groups DTG1-1 to DTG1-m may be first compressed data C1 of the compressed data DATA_CP, a value obtained by performing an XOR operation on the m data stored in the second cells R2 of the (1-1)-th to (1-m)-th data groups DTG1-1 to DTG1-m may be second compressed data C2 of the compressed data DATA_CP, a value obtained by performing an XOR operation on the m data stored in the third cells R3 of the (1-1)-th to (1-m)-th data groups DTG1-1 to DTG1-m may be third compressed data C3 of the compressed data DATA_CP, and a value obtained by performing an XOR operation on the m data stored in the K-th cells RK of the (1-1)-th to (1-m)-th data groups DTG1-1 to DTG1-m may be K-th compressed data CK of the compressed data DATA_CP. Therefore, the number of bits of the compressed data DATA_CP is the same as the number of bits of each of the (1-1)-th to (1-m)-th data groups DTG1-1 to DTG1-m. For example, assuming that each of the (1-1)-th to (1-m)-th data groups DTG1-1 to DTG1-m includes the K bits of data, the compressed data DATA_CP may also be generated to have K bits of data.

At S95, the CRC controller 32 may generate the cyclic redundancy check code CRCC including L bits by performing the cyclic redundancy check operation using the K bits of compressed data DATA_CP. In the prior art, the cyclic redundancy check operation is performed using N bits of data, but in the present embodiment, the cyclic redundancy check operation is performed using the K bits of compressed data DATA_CP that are less than the N bits of data. Therefore, in the present embodiment, the cyclic redundancy check operation may be simplified and its operation time may also be shortened.

At S96, the CRC controller 32 may generate the cyclic redundancy check count code CRCCv by performing an XOR operation on the cyclic redundancy check code CRCC and the total count value CV.

Figure 11:
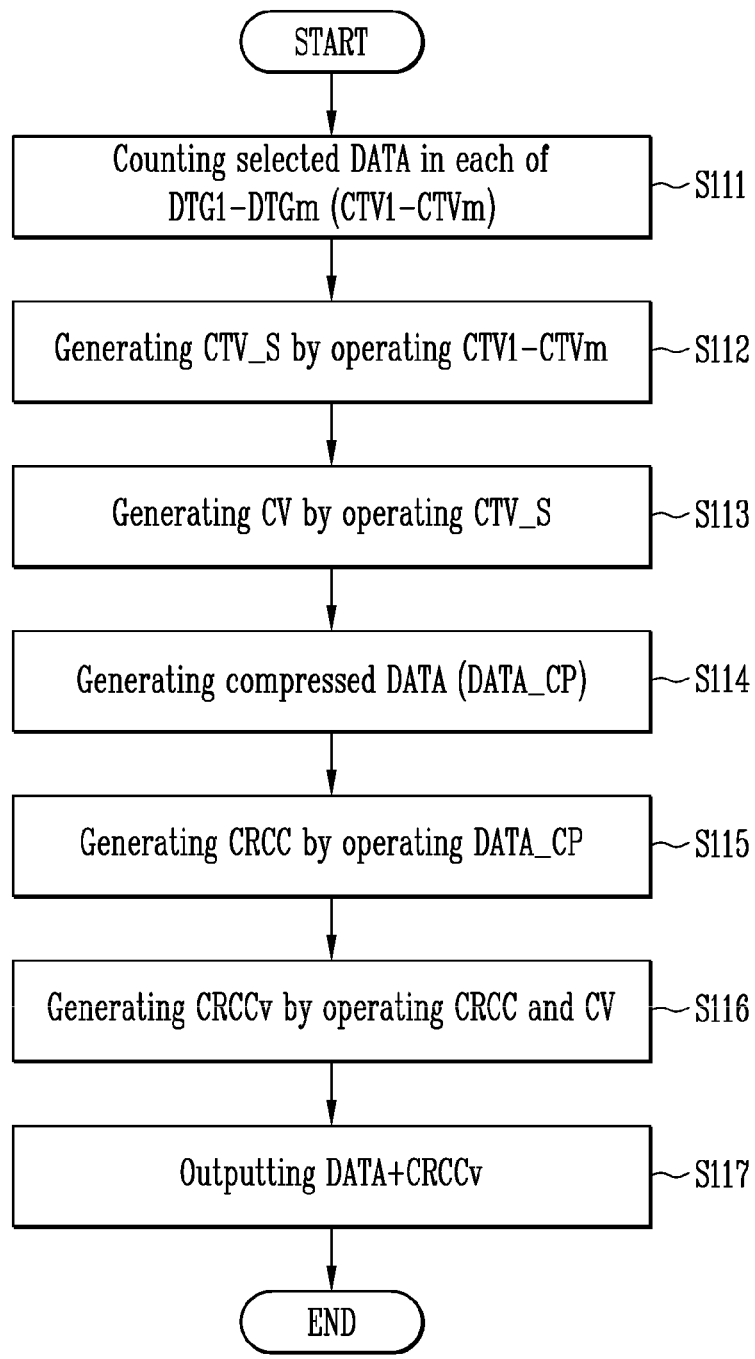
FIG. 11 is a flowchart illustrating a method of operating a controller according to a fourth embodiment of the present disclosure.

FIG. 11 is a flowchart illustrating a method of operating a controller according to a fourth embodiment of the present disclosure. The method of FIG. 11 will be described with reference to FIG. 4.

Referring to FIG. 11, when data DATA including N bits is input to the buffer 31, the CRC controller 32 may divide the data DATA into the first to m-th data groups DTG1 to DTGm, each of which includes K bits of data.

The CRC controller 32 may calculate first to m-th count values CTV1 to CTVm by counting the number of selected data included in each of the first to m-th data groups DTG1 to DTGm at S111. For example, when the selected data is 1, the number of 1 data included in the first data group DTG1 may be calculated as the first count value CTV1. Each of the first to m-th count values CTV1 to CTVm may be generated as a binary notation code. The number of bits of the first to m-th count values CTV1 to CTVm may be the same. For example, when the first count value CTV1 includes J bits of data (J is a positive integer), each of the remaining second to m-th count values CTV2 to CTVm may also include J bits of data.

The CRC controller 32 may generate a sub count value CTV_S by processing the first to m-th count values CTV1 to CTVm at S112. The sub count value CTV_S includes J bits of data. For example, a value obtained by performing an XOR operation of all data configuring the first to m-th count values CTV1 to CTVm may be generated as the sub count value CTV_S.

The CRC controller 32 may generate a total count value CV by processing the sub count value CTV_S at S113. For example, the total count value CV may be obtained by performing an XOR operation on all bits of the sub count value CTV_S.

The CRC controller 32 may generate the compressed data DATA_CP by compressing the data DATA of the first to m-th data groups DTG1 to DTGm at S114. For example, the CRC controller 32 may generate the compressed data DATA_CP having K bits by logically combining the data stored in cells at the same position among the data of the first to m-th data groups DTG1 to DTGm.

The CRC controller 32 may generate the cyclic redundancy check code CRCC by processing the compressed data DATA_CP having K bits at S115. Since the compressed data DATA_CP includes the K bits of data that are less than the N bits of data, the cyclic redundancy check operation performed by the CRC controller 32 may be simplified, and thus the time required for the cyclic redundancy check operation may be shortened.

Among the above-described S111 to S115, an order of S111 to S113 for generating the total count value CV and S114 to S115 for generating the cyclic redundancy check code CRCC may be changed.

The CRC controller 32 may generate a cyclic redundancy check count code CRCCv by logically combining the cyclic redundancy check code CRCC and the total count value CV at S116. For example, the cyclic redundancy check count code CRCCv may be calculated by performing an XOR operation on the cyclic redundancy check code CRCC and the total count value CV.

When the cyclic redundancy check count code CRCCv is generated, the CRC controller 32 may output a data set DATA+CRCCv, in which the cyclic redundancy check count code CRCCv is added to the data DATA, at S117.

The operation method according to the fourth embodiment described with reference to FIG. 11 is more specifically described as follows.

Figure 12A:
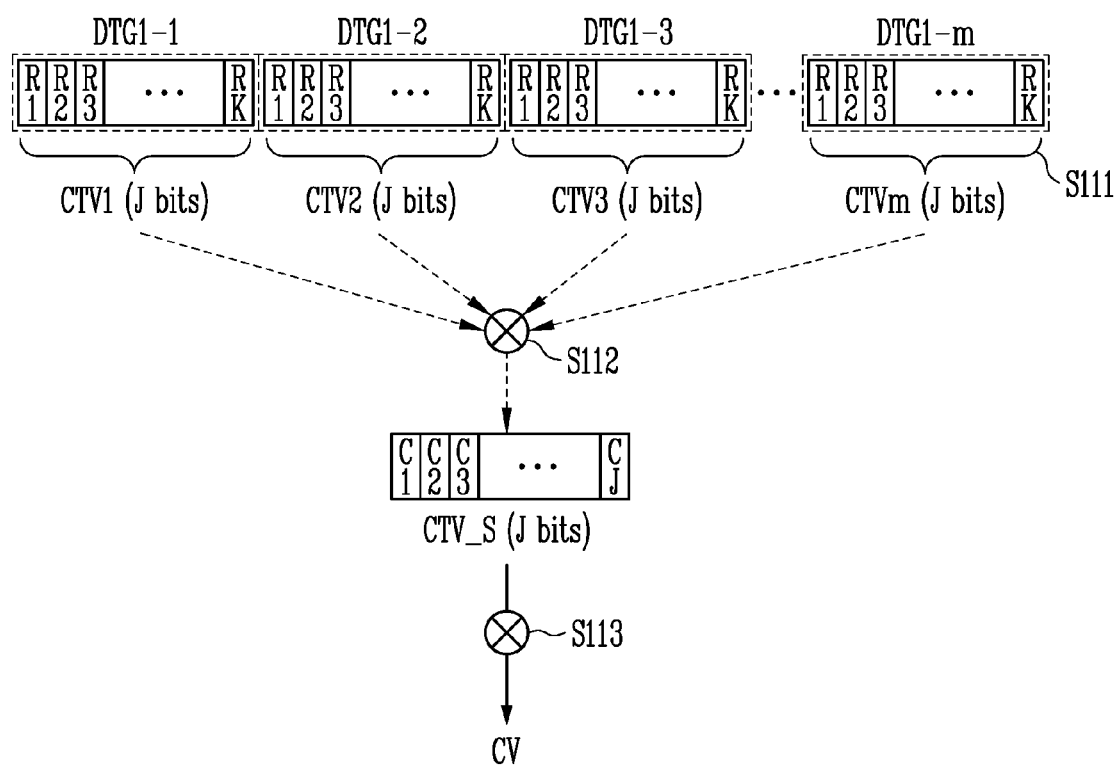
FIGS. 12A and 12B specifically illustrate the method of operating the controller according to the fourth embodiment of the present disclosure.
Figure 12B:
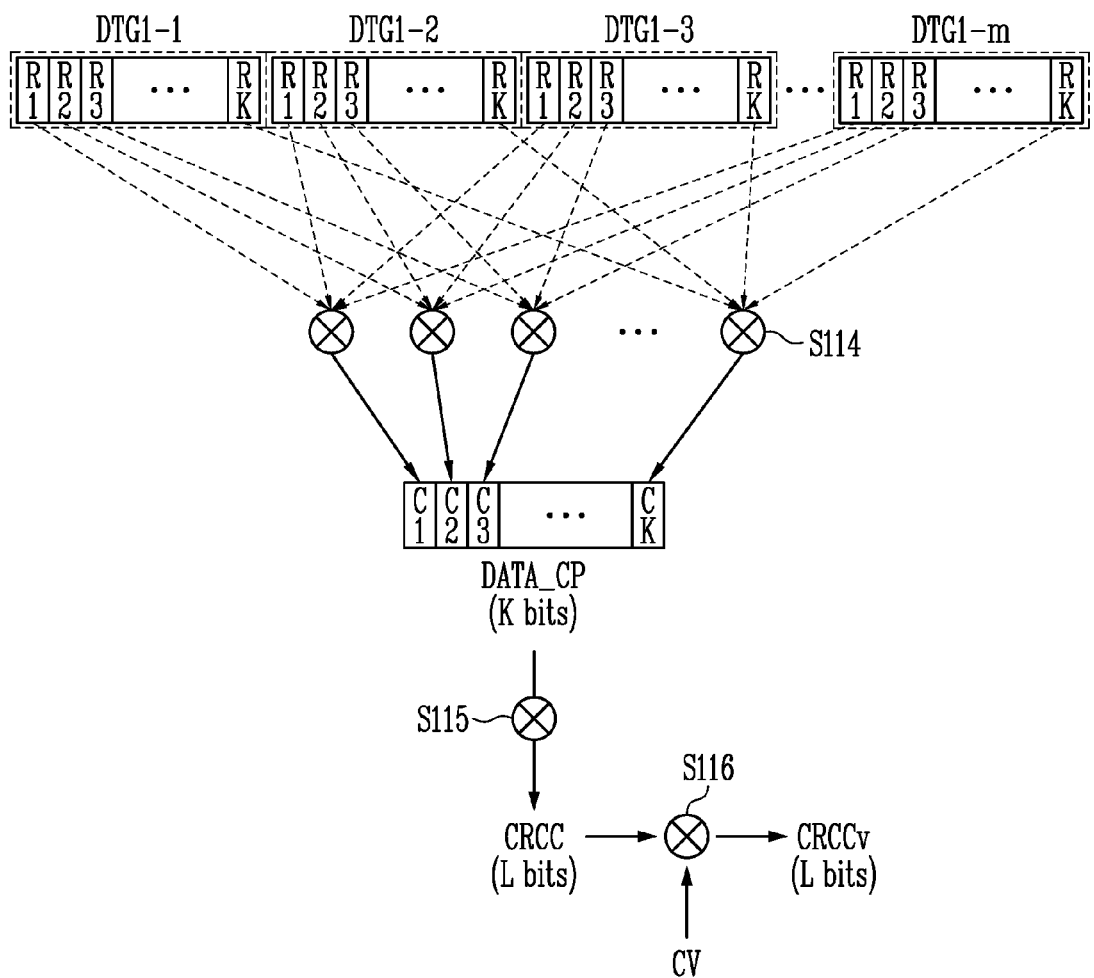

FIGS. 12A and 12B specifically illustrate the method of operating the controller according to the fourth embodiment of the present disclosure.

Referring to FIG. 12A, S111 to S113 described with reference to FIG. 11 are specifically shown.

At S111, the number of selected data included in each of the (1-1)-th to (1-m)-th data groups DTG1-1 to DTG1-m may be calculated as the first to m-th count values CTV1 to CTVm. For example, it is assumed that the selected data is 1, and each of the (1-1)-th to (1-m)-th data groups DTG1-1 to DTG1-m includes the K bits of data. In this case, each of the (1-1)-th to (1-m)-th data groups DTG1-1 to DTG1-m may include the data stored in the first to K-th cells R1 to RK. When the (1-1)-th data group DTG1-1 is described as an example, the data included in the (1-1)-th data group DTG1-1 may be stored in the first to K-th cells R1 to RK by 1 bit. The data includes 0 or 1, and 1 is the selected data in the present embodiment. Therefore, the CRC controller 32 may calculate the first count value CTV1 by counting the number of 1 data included in the (1-1)-th data group DTG1-1. Each of the first to m-th count values CTV1 to CTVm may be generated as a binary notation code. The number of bits included in each of the first to m-th count values CTV1 to CTVm may be the same. For example, when the first count value CTV1 includes a J-bit code (J is a positive integer), each of the remaining second to m-th count values CTV2 to CTVm may also include a J-bit code.

At S112, the CRC controller 32 may generate the sub count value CTV_S including J bits of data by performing an XOR operation on the first to m-th count values CTV1 to CTVm.

At S113, the CRC controller 32 may generate the total count value CV by processing the sub count value CTV_S. For example, the total count value CV may be obtained by performing an XOR operation on all bits of the compression count value CTV_CP.

Referring to FIG. 12B, steps S114 to S116 described with reference to FIG. 11 are specifically shown.

At S114, the compressed data DATA_CP may be generated by performing an XOR operation on data at the same position in the (1-1)-th to (1-m)-th data groups DTG1-1 to DTG1-m. For example, a value obtained by performing an XOR operation on the data stored in the first cells R1 of the (1-1)-th to (1-m)-th data groups DTG1-1 to DTG1-m may be first compressed data C1 of the compressed data DATA_CP, a value obtained by performing an XOR operation on the data stored in the second cells R2 of the (1-1)-th to (1-m)-th data groups DTG1-1 to DTG1-m may be second compressed data C2 of the compressed data DATA_CP, a value obtained by performing an XOR operation on the data stored in the third cells R3 of the (1-1)-th to (1-m)-th data groups DTG1-1 to DTG1-m may be third compressed data C3 of the compressed data DATA_CP, and a value obtained by performing an XOR operation on the data stored in the K-th cells RK of the (1-1)-th to (1-m)-th data groups DTG1-1 to DTG1-m may be K-th compressed data CK of the compressed data DATA_CP. Therefore, the number of bits of the compressed data DATA_CP is the same as the number of bits of each of the (1-1)-th to (1-m)-th data groups DTG1-1 to DTG1-m. For example, assuming that each of the (1-1)-th to (1-m)-th data groups DTG1-1 to DTG1-m includes the K bits of data, the compressed data DATA_CP may also be generated to have K bits of data.

At S115, the CRC controller 32 may generate the cyclic redundancy check code CRCC including L bits by performing the cyclic redundancy check operation using the K bits of compressed data DATA_CP.

At S116, the CRC controller 32 may calculate the cyclic redundancy check count code CRCCv by performing an XOR operation on the cyclic redundancy check code CRCC and the total count value CV. The cyclic redundancy check count code CRCCv may include L bits.

Figure 13:
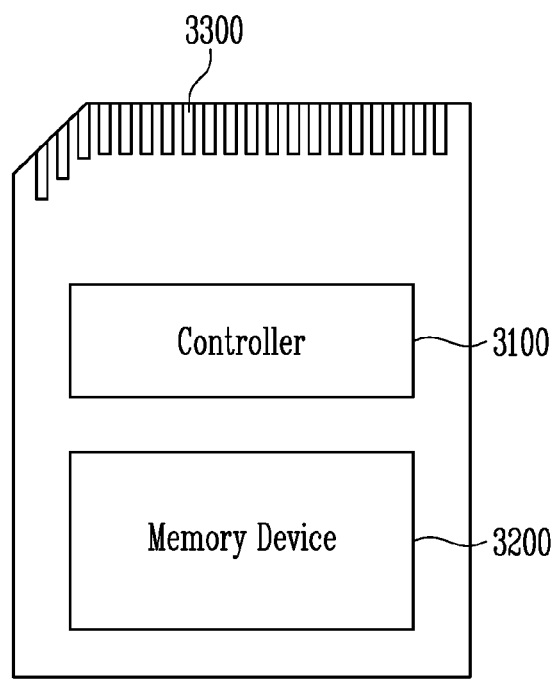
FIG. 13 illustrates a memory card system to which a controller of the present disclosure is applied.

FIG. 13 illustrates a memory card system 3000 to which the controller of the present disclosure is applied.

Referring to FIG. 13, the memory card system 3000 includes a controller 3100, a memory device 3200, and a connector 3300.

The controller 3100 is connected to the memory device 3200. The controller 3100 is configured to access the memory device 3200. For example, the controller 3100 may be configured to control a program, read, or erase operation of the memory device 3200 or a background operation. The controller 3100 may perform a function of the controller 1200 described with reference to FIG. 2. The controller 3100 is configured to provide an interface between the memory device 3200 and a host (not shown). The controller 3100 is configured to drive firmware for controlling the memory device 3200.

For example, the controller 3100 may include components such as a random access memory (RAM), a processing unit, a host interface, a memory interface, and an error correction circuit.

The controller 3100 may communicate with an external device (for example, the host) through the connector 3300. The controller 3100 may communicate with the external device according to one or more of various communication standards such as a universal serial bus (USB), a multimedia card (MMC), an embedded MMC (eMMC), peripheral component interconnection (PCI), PCI-express (PCI-E), advanced technology attachment (ATA), serial-ATA, parallel-ATA, a small computer system interface (SCSI), an enhanced small disk interface (ESDI), integrated drive electronics (IDE), firewire, a universal flash storage (UFS), WIFI, Bluetooth, NVMe, and so on. For example, the connector 3300 may be defined by at least one of the various communication standards described above.

For example, the memory device 3200 may be configured of one or more of various non-volatile memory devices such as an electrically erasable and programmable ROM (EEPROM), a NAND flash memory, a NOR flash memory, a phase-change RAM (PRAM), a resistive RAM (ReRAM), a ferroelectric RAM (FRAM), a spin transfer torque-magnetic RAM (STT-MRAM), and so on.

The controller 3100 and the memory device 3200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), a universal flash storage (UFS), or the like.

Figure 14:
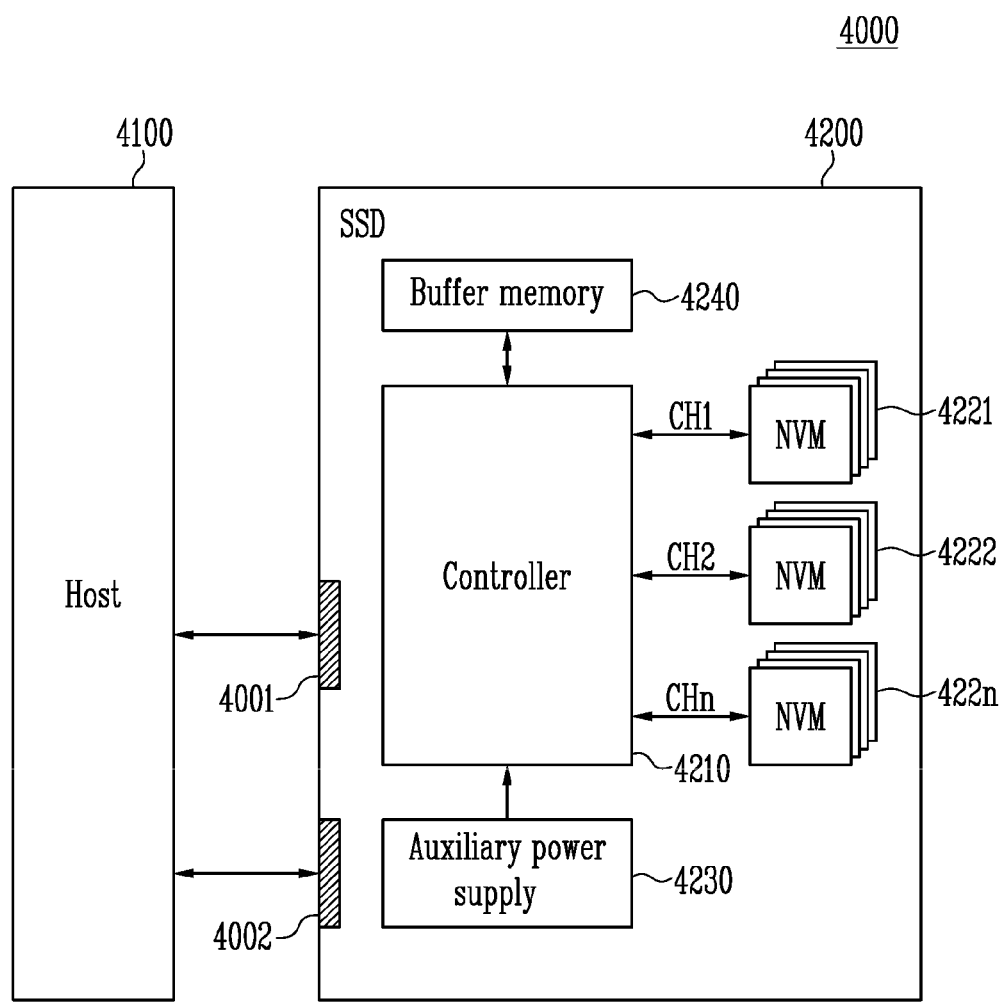
FIG. 14 illustrates a solid state drive (SSD) system to which a controller of the present disclosure is applied.

FIG. 14 illustrates a solid state drive (SSD) system 4000 to which the controller of the present disclosure is applied.

Referring to FIG. 14, the SSD system 4000 includes a host 4100 and an SSD 4200. The SSD 4200 exchanges a signal with the host 4100 through a signal connector 4001 and receives power through a power connector 4002. The SSD 4200 includes a controller 4210, a plurality of nonvolatile memories (NVMs) 4221 to 422n, an auxiliary power supply 4230, and a buffer memory 4240.

The controller 4210 may perform the function of the controller 1200 described with reference to FIG. 2.

The controller 4210 may control the plurality of nonvolatile memories 4221 to 422n in response to a signal received from the host 4100. For example, the signal may include signals based on an interface between the host 4100 and the SSD 4200. For example, the signal may be a signal defined by at least one of interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), firewire, a universal flash storage (UFS), WIFI, Bluetooth, an NVMe, and so on.

The auxiliary power supply 4230 is connected to the host 4100 through the power connector 4002. The auxiliary power supply 4230 may receive a power voltage from the host 4100 and charge the power voltage. When power supply from the host 4100 is not smooth, the auxiliary power supply 4230 may provide the power voltage to the SSD 4200. For example, the auxiliary power supply 4230 may be positioned in the SSD 4200 or outside the SSD 4200. For example, the auxiliary power supply 4230 may be positioned on a main board and may provide auxiliary power to the SSD 4200.

The buffer memory 4240 operates as a buffer memory of the SSD 4200. For example, the buffer memory 4240 may temporarily store data received from the host 4100 or data received from the plurality of nonvolatile memories 4221 to 422n, or may temporarily store meta data (for example, a mapping table) of the nonvolatile memories 4221 to 422n. The buffer memory 4240 may include a volatile memory such as a DRAM, an SDRAM, a DDR SDRAM, an LPDDR SDRAM, or the like, or a nonvolatile memory such as an FRAM, a ReRAM, an STT-MRAM, a PRAM, or the like.

What is claimed is:
1. A controller, comprising:
a buffer in which N bits of data are stored; and
a cyclic redundancy check controller configured to generate m data groups each including K bits of data by dividing the N bits of data stored in the buffer, generate compressed data including K bits by processing data included in the m data groups, and generate a cyclic redundancy check code using the compressed data,
wherein the cyclic redundancy check controller is further configured to count a number of selected data included in each of the m data groups and generate a plurality of count values respectively corresponding to the m data groups, each of the count values including J bits of data, J being a positive integer.

2. The controller of claim 1, wherein N, m, and K are positive integers, and
N satisfies m×K.

3. The controller of claim 1, wherein the buffer includes a plurality of cell groups respectively corresponding to the m data groups, each cell group including K cells, and the K cells of each of the cell groups respectively store the K bits of data included in a corresponding one of the m data groups.

4. The controller of claim 3, wherein the cyclic redundancy check controller is configured to generate the compressed data including the K bits, each of which is obtained by performing an XOR operation on data stored in I-th cells of the cell groups, I being in a range of 1 to K.

5. The controller of claim 1, wherein the cyclic redundancy check controller is further configured to output a data set obtained by adding the cyclic redundancy check code to the N bits of data.

6. The controller of claim 1, wherein the cyclic redundancy check controller is further configured to generate a compression count value by logically combining data configuring the plurality of count values, and generate a total count value by performing an XOR operation on data included in the compression count value.

7. The controller of claim 6, wherein the cyclic redundancy check controller is further configured to generate a cyclic redundancy check count code by performing an XOR operation on the total count value and the cyclic redundancy check code, and output a data set that is obtained by adding the cyclic redundancy check count code to the N bits of data.

8. The controller of claim 1, wherein the cyclic redundancy check controller is further configured to generate a sub count value by performing an XOR operation on I-th bits among the J bits of data of each of the plurality of count values, I being in a range of 1 to J, and generate a total count value by performing an XOR operation on all bits of the sub count value.

9. The controller of claim 8, wherein the cyclic redundancy check controller is configured to generate a cyclic redundancy check count code by performing an XOR operation on the total count value and the cyclic redundancy check code, and output a data set obtained by adding the cyclic redundancy check count code to the N bits of data.

10. A method of operating a controller, the method comprising:
generating a plurality of data groups by dividing input data;
generating a plurality of count values respectively corresponding to the plurality of data groups by counting a number of selected data included in each of the plurality of data groups;
generating compressed data by logically combining data included in the plurality of data groups in a bit unit; and
generating a cyclic redundancy check code by performing a cyclic redundancy check operation on the compressed data.

11. The method of claim 10, wherein when the input data includes N bits and the plurality of data groups are m data groups, each of the plurality of data groups includes K bits of data, K being N/m, K, m, and N being positive integers.

12. The method of claim 11, wherein in generating the plurality of data groups, a plurality of cells included in a buffer of the controller are divided into a plurality of cell groups respectively corresponding to the plurality of data groups, each cell group including K cells respectively storing the K bits of data included in each of the plurality of data groups.

13. The method of claim 12, wherein generating the compressed data comprises generating the compressed data including K bits, each of which is obtained by performing an XOR operation on data stored in I-th cells of the cell groups, I being in a range of 1 to K.

14. The method of claim 10, further comprising:
outputting a data set obtained by adding the cyclic redundancy check code to the input data after generating the cyclic redundancy check code.

15. The method of claim 10, further comprising, between generating the plurality of data groups and generating the compressed data:
generating a compression count value by performing an XOR operation on all bits included in each of the plurality of count values; and
generating a total count value by performing an XOR operation on all bits of the compression count value.

16. The method of claim 15, further comprising, after generating the cyclic redundancy check code:
generating a cyclic redundancy check count code by performing an XOR operation on the cyclic redundancy check code and the total count value; and
outputting a data set obtained by adding the cyclic redundancy check count code to the input data.

17. The method of claim 10, further comprising, between generating the plurality of data groups and generating the compressed data:
generating a sub count value by performing an XOR operation on I-th bits among J bits of data of each of the plurality of count values, I being in a range of 1 to J; and
generating a total count value by performing an XOR operation on all bits of the sub count value.

18. The method of claim 17, further comprising, after generating the cyclic redundancy check code:
generating a cyclic redundancy check count code by performing an XOR operation on the cyclic redundancy check code and the total count value; and
outputting a data set obtained by adding the cyclic redundancy check count code to the input data.

* * * * *